US012025047B2

(12) United States Patent
Bussieres

(10) Patent No.: US 12,025,047 B2
(45) Date of Patent: Jul. 2, 2024

(54) FLOW GUIDING DEVICE, CYLINDER HEAD ASSEMBLY, AND INTERNAL COMBUSTION ENGINE

(71) Applicant: INNIO Jenbacher GmbH & Co OG, Jenbach (AT)

(72) Inventor: Frederic Bussieres, Innsbruck (AT)

(73) Assignee: Innio Jenbacher GmbH & Co OG, Jenbach (AT)

(*) Notice: Subject to any disclaimer, the term of this patent is extended or adjusted under 35 U.S.C. 154(b) by 0 days.

(21) Appl. No.: 18/019,779

(22) PCT Filed: Aug. 7, 2020

(86) PCT No.: PCT/AT2020/060293
§ 371 (c)(1),
(2) Date: Feb. 3, 2023

(87) PCT Pub. No.: WO2022/027076
PCT Pub. Date: Feb. 10, 2022

(65) Prior Publication Data
US 2024/0035410 A1 Feb. 1, 2024

(51) Int. Cl.
*F01P 3/16* (2006.01)
*F02B 19/12* (2006.01)
*F02F 1/40* (2006.01)

(52) U.S. Cl.
CPC ................ *F01P 3/16* (2013.01); *F02B 19/12* (2013.01); *F02F 1/40* (2013.01)

(58) Field of Classification Search
CPC ................ F01P 3/16; F02B 19/12; F02F 1/40
USPC .......................................................... 123/253
See application file for complete search history.

(56) References Cited

U.S. PATENT DOCUMENTS

| | | | | |
|---|---|---|---|---|
| 3,176,666 | A | 4/1965 | Whitehead | |
| 11,459,976 | B2 | 10/2022 | Klampfer et al. | |
| 2011/0146618 | A1 | 6/2011 | LaPointe et al. | |
| 2019/0234293 | A1* | 8/2019 | Holzhammer | F02B 19/1009 |

FOREIGN PATENT DOCUMENTS

| | | | | | |
|---|---|---|---|---|---|
| AT | 521514 | A4 | | 2/2020 | |
| DE | 3622142 | C1 | | 2/1988 | |
| DE | 102005031243 | A1 | | 2/2006 | |
| EP | 3051092 | B1 | * | 3/2018 | F01P 3/16 |
| FR | 711522 | A | | 9/1931 | |
| WO | WO-2013081733 | A2 | * | 6/2013 | F02B 19/1009 |
| WO | WO-2017003460 | A1 | * | 1/2017 | F01P 3/02 |

OTHER PUBLICATIONS

PCT International Search Report and Written Opinion; Application No. PCT/AT2020/060293; dated Mar. 12, 2021; 12 pages.

* cited by examiner

*Primary Examiner* — Mahmoud Gimie
(74) *Attorney, Agent, or Firm* — Fletcher Yoder, P.C.

(57) ABSTRACT

A flow guiding device for an internal combustion engine includes a main body substantially in the shape of a surface shell of a truncated cone and/or a cylinder and a plurality of orifices in the main body. The main body is adapted to be mounted between a cylinder head body and an ignition assembly of the internal combustion engine, and wherein the orifices are adapted to guide a cooling medium between an outside volume and an inside volume of the truncated cone or cylinder.

26 Claims, 7 Drawing Sheets

FLOW GUIDING DEVICE, CYLINDER HEAD ASSEMBLY, AND INTERNAL COMBUSTION ENGINE

CROSS-REFERENCE TO RELATED APPLICATION

This application is a National Stage entry from, and claims benefit of, PCT Application No. PCT/AT2020/060293, filed on Aug. 7, 2020; entitled "FLOW GUIDING DEVICE, CYLINDER HEAD ASSEMBLY, AND INTERNAL COMBUSTION ENGINE", which is herein incorporated by reference in its entirety.

BACKGROUND

The present invention concerns a flow guiding device for an internal combustion engine, a cylinder head assembly, and methods for cooling a cylinder head.

Accordingly, the present invention concerns a cylinder head assembly for an internal combustion engine comprising a cylinder head body, an ignition assembly, preferably including a pre-chamber, and a cooling cavity for cooling the cylinder head and the ignition assembly, the cooling cavity including bridge cavities for cooling a fire deck of the cylinder head, the bridge cavities leading from a peripheral part of the cylinder head between inlet openings and exhaust openings in the cylinder head to a central part of the cylinder head, the cooling cavity furthermore comprising

- a central cavity in the central part of the cylinder head, which central cavity at least partly surrounds the ignition assembly, and which is in fluid communication with the bridge cavities, and/or
- axial channels, which are disposed around the ignition assembly, which are essentially parallel to a longitudinal axis of the ignition assembly, and which are in fluid communication with the bridge cavities and, if present, the central cavity.

Known in the prior art is the cooling of the cylinder head employing a cooling circuit. Critical zones of the cylinder head for cooling are the fire deck, which delimits at least one main combustion chamber of the internal combustion engine and the vicinity of the ignition assembly, in particular close to the fire deck. The reason why the fire deck is critical are of course the high thermal and mechanical stresses from the ignition and combustion of the fuel air mixture in the main combustion chamber and, potentially, in a pre-chamber (as part of the ignition assembly).

In cylinder heads according to the prior art, the cooling circuit for the cylinder head is integrated into a further cooling circuit for the main combustion chamber (delimited by a cylinder liner and/or the crank case). Collectively, these cooling circuits are often known as a "water jacket". It should however be pointed out that the cooling medium used in engines and cylinder heads according to the prior art, as well as according to the invention, does not have to be (pure) water.

Since the main combustion chamber and the fire deck tend to receive higher thermal and mechanical loads than the ignition assembly, conventionally, the cooling medium flow is directed past the main combustion chamber, then the fire deck, and lastly past the ignition assembly.

Nevertheless, the cooling of the fire deck is in many cases a limiting factor to engine performance and/or longevity.

BRIEF DESCRIPTION

The object of certain embodiments of the invention is therefore to provide a flow guiding device, a cylinder head assembly, and methods with improved cooling in the area of the fire deck in the vicinity of the bridge cavities.

Regarding the flow guiding device, the object is achieved with a flow guiding device for an internal combustion engine, including:

- a main body substantially in the shape of a surface shell of a truncated cone and/or a cylinder, and
- a plurality of orifices in the main body, wherein the main body is adapted to be mounted between a cylinder head body and an ignition assembly of the internal combustion engine, and wherein the orifices are adapted to guide a cooling medium between an outside volume and an inside volume of the truncated cone or cylinder.

Mounting a flow guiding device, according to certain embodiments of the invention, between a cylinder head and an ignition assembly of an internal combustion engine can increase the flow velocity of the cooling medium from and/or towards the bridge cavities, which results in higher amount of heat discharged from the fire deck through the cooling medium conveyed through the bridge cavities.

As a further advantage, a flow guiding device, according to certain embodiments of the invention, can be easily mounted in an existing cylinder head assembly, both in the sense that little to no changes to an already existing design of a cylinder head has to be made, and that already manufactured cylinder heads can be retrofitted with flow guiding devices with relative ease.

Regarding the cylinder head assembly, the object of certain embodiments of the invention is also achieved with the cylinder head assembly having a pump configured to convey a cooling medium from the bridge cavities, preferably through the central cavity, to the axial channels, and wherein located at transitions, the transitions being between the bridge cavities and the central cavity and/or between the bridge cavities and the axial channels, there are provided orifices with a smaller cross-sectional area than the bridge cavities, such that a flow velocity of the cooling medium towards the central part of the cylinder head is increased at least in a region of the bridge cavities due to the passing of the cooling medium through the orifices.

As described before, making use of orifices at the transitions, according to certain embodiments of the invention, can increase the flow velocity of the cooling medium from and/or towards the bridge cavities, which results in higher amount of heat discharged from the fire deck through the cooling medium conveyed through the bridge cavities.

The object of certain embodiments of the invention regarding the cylinder head is also achieved with a cylinder head assembly having a pump configured to convey a cooling medium from the central cavity and/or the axial channels to the bridge cavities, and wherein located at transitions, the transitions being between the bridge cavities and the central cavity and/or between the bridge cavities and the axial channels, there are provided orifices with a smaller cross-sectional area than the bridge cavities, such that a flow velocity of the cooling medium towards the peripheral part of the cylinder head is increased at least in a region of the bridge cavities due to the passing of the cooling medium through the orifices and preferably such that a direction of the cooling medium flow has a component towards the fire deck of the cylinder head.

For example, in some embodiments of the invention, the flow of cooling medium is reversed, i.e., instead of pumping the cooling medium from the bridge cavities to the axial channels, the cooling medium is pumped from the axial channels to the bridge cavities.

It is a further preferred aspect of the invention that such a reversing of the flow of the cooling medium can improve the cooling of the fire deck in the vicinity of the bridge cavities significantly—according to tests conducted by the applicant the increase of cooling performance with orifices and a reversed flow of cooling medium can be increased almost three times compared to the prior art.

On the one hand, this results from the fact that the cooling medium does not arrive at the bridge cavities pre-heated from the part of the water jacket surrounding the main combustion chamber when the cooling medium flow is reversed.

On the other hand, pumping the cooling medium from the axial channels towards the bridge cavities allows the orifices not only to create a narrower and therefore faster flow profile of the cooling medium, but also to direct the cooling medium flow onto the fire deck. In other words, by gaining a component towards the fire deck of the cylinder head, the cooling medium impinges on the wall of the bridge cavity forming the back of the fire deck, improving the cooling performance exactly where needed.

Naturally, the orifices at the transitions in a cylinder head, according to certain embodiments of the invention, can be realised with a flow guiding device according to certain embodiments of the invention. In other words, the orifices can be arranged on flow guiding devices according to certain embodiments of the invention.

Regarding a method, the object of certain embodiments of the invention is achieved with the characteristics of:

- a cylinder head with bridge cavities is provided,
- at transitions from the bridge cavities:
  - to a central cavity of the cylinder head, which at least partially surrounds an ignition assembly of the cylinder head, and/or
  - to axial channels, which are disposed around an ignition assembly, and which are essentially parallel to a longitudinal axis of the ignition assembly, orifices with a smaller cross-sectional area than the bridge cavities are provided,
- a cooling medium is pumped through the bridge cavities and the orifices from a peripheral part of the cylinder head to a central part of the cylinder head in order to cool a fire deck of the cylinder head,
- such that a flow velocity of the cooling medium towards the central part of the cylinder head is increased at least in a region of the bridge cavities due to the passing of the cooling medium through the orifices.

The object of certain embodiments of the invention is also achieved with the characteristics of:

- a cylinder head with bridge cavities is provided,
- at transitions from the bridge cavities to:
  - a central cavity of the cylinder head, which at least partially surrounds an ignition assembly of the cylinder head, and/or
  - axial channels, which are disposed around an ignition assembly, and which are essentially parallel to a longitudinal axis of the ignition assembly,
- orifices with a smaller cross-sectional area than the bridge cavities are provided,
- a cooling medium is pumped through the orifices and the bridge cavities from a central part of the cylinder head to a peripheral part of the cylinder head in order to cool a fire deck of the cylinder head,
- such that a flow velocity of the cooling medium towards the central part of the cylinder head is increased at least in a region of the bridge cavities due to the passing of the cooling medium through the orifices and preferably such that a direction of the cooling medium flow has a component towards the fire deck of the cylinder head.

The common basic idea of certain embodiments of the invention is to use orifices for guiding the flow of the cooling medium such that an increased flow velocity is reached, and in some instances a component of the cooling medium flow in the direction of the fire deck.

The fire plate can be a component part separate from the main body of the cylinder head, or, preferably, be integrated into the main body of the cylinder head.

Protected are also an internal combustion engine having at least one cylinder head according to certain embodiments of the invention.

Such internal combustion engines can preferably be piston engines, such as stationary or naval engines, in particular gas engines. Such engines may employ a lean burn concept. Essentially stoichiometric combustion may however also be conceivable.

Embodiments of the invention can be particularly effective on large engines with more than 8, 10 or 12 cylinders and six litres or more of displacement per cylinder.

In particular gas engines, but also other internal combustion engines, driving a generator for creating electrical energy can be preferred. Such arrangements are known as “gensets”.

The cooling medium can preferably comprise water as a main component, potentially with additives.

The cooling cavity can comprise one or more branches (parallel or in series) in order to better reach as many of the critical parts of the cylinder head according to certain embodiments of the invention. The cooling cavity can be integrated into a water jacket of the working cylinder.

The cooling circuit can, in particular operating states, also be used to heat the affected areas, e.g., for pre-heating before an operation of the internal combustion engine.

The orifices, according to certain embodiments of the invention, can be realised by only the flow guiding device, or for example can be realised by the flow guiding device together with a cavity wall at the transitions.

A central part of a cylinder head can be understood as the part of the cylinder head closest to a central axis of a main combustion chamber, which in most cases will overlap with where the ignition assembly is arranged. Analogously, a peripheral part of a cylinder head can be understood as a part of the cylinder head not in the centre of the cylinder head and for example near a circumference of the cylinder head.

Cylinder head assemblies, according to certain embodiments of the invention, can be configured for single cylinders/main combustion chambers or several cylinders/main combustion chambers. Naturally, the pump, according to certain embodiments of the invention, can be used to additionally service one or more cylinders/main combustion chambers.

The orifices can be embodied as holes in the main body of the flow guiding device.

Further preferred embodiments are defined in the dependent claims.

The flow guiding device

- can preferably be embodied as at least one separate component part, and/or
- can preferably be mounted between the cylinder head body and the ignition assembly, and/or
- can at least partially—preferably fully—surround the ignition assembly, and/or
- can be arranged on an end of the ignition assembly closest to the fire deck.

Since conventional manufacturing processes have limitations regarding the geometry of the cooling circuit, at least one separate component part can be an easy way for implementing the flow guiding device according to certain embodiments of the invention.

At least one separate component part for the blind may also have the advantage that the blind can be installed and removed relatively easily from the cylinder head.

At least one separate component part for the flow guiding device may also have the advantage that the blind can be installed and removed relatively easily from the cylinder head.

In a preferred embodiment of the invention, there is exactly one flow guiding device (per cylinder), particularly preferably embodied as exactly one separate component part.

The flow guiding device can substantially be arranged around the ignition assembly.

As mentioned before, this can in particular mean, that the flow guiding device surrounds the ignition assembly at least partly, preferably completely.

Embodiments where the ignition assembly is arranged in an opening of the cylinder head body and at the same time serve as delimitation of the cooling cavity can be particularly preferred as they can provide a particularly easy to manufacture arrangement.

It can be provided that first orifices, which are adjacent to the intake openings in the cylinder head body, have a smaller cross-sectional area than second orifices, which are adjacent to the exhaust openings in the cylinder head body. Some of the highest thermal and mechanical loads occur around the intake and, particularly, the exhaust openings. This is even more pronounced where the intake and exhaust openings are close to the ignition assembly. In arranging the orifices, according to certain embodiments of the invention, to these areas, they can be cooled particularly effectively. Expressed differently, by adapting the sizes of the first and second orifices, the cooling potential can be scaled appropriately to reflect the need for cooling in the respective area.

It can preferably be provided that the central cavity and/or the axial channels are delimited in part by the ignition assembly and in part by the cylinder head body.

It can be provided that

- there are at least two, preferably at least three, and particularly preferably exactly four orifices, and/or
- the orifices are in the shape of rounded oblong holes, and/or circular holes, and/or cut-outs at an end of the main body closest to the fire deck, and/or
- the orifices are evenly distributed circumferentially around the truncated cone and/or the cylinder head and/or the ignition assembly.

In preferable embodiments there are at least three, particularly preferably exactly four, orifices which are each arranged in one of four bridge cavities.

However, other embodiments are conceivable where there are only two bridge cavities (e.g., when there are only one intake and one exhaust valve).

It can be provided that the cooling cavity is manufactured during casting of the cylinder head body or through bores.

The orifices can, as mentioned, be of rounded oblong or circular shape. Other shapes are however conceivable, e.g., circular shapes or polygonal shapes.

In other preferred embodiments, the orifices are formed as cut-outs at an end of the main body closest to the fire deck (i.e., the orifices in the main body are then "open").

The ignition assembly can be arranged inside an opening of the cylinder head body.

A particularly preferred way for fixing the flow guiding device inside the cylinder head assembly is through geometrical features locking the blind in position (positive locking). Other ways for fixing the flow guiding device could be at least one of the following: a threaded connection, gluing, bonding, welding, rivets, brazing.

It should however be mentioned that, additional to the basic shape of a truncated cone and/or a cylinder, there can also be a curvature of the truncated cone surface along its central axis. Additionally or alternatively, there can be further geometrical features for locking the blind in place.

The truncated cone and/or the cylinder-shape can have circular cross-sections along its axis. Of course, other cross-section shapes, like an oval shape or a polygonal shape, are in principle also possible.

The truncated cone can be understood as a body which has a varying size of otherwise same or similar cross-section along an axis. In particular, the size of the cross-section can decrease or increase monotonically along the axis.

A narrower part of the truncated cone shape can be arranged closer to the fire plate than a wider part of the cone shape. In a vertically arranged cylinder, the truncated cone shape can be inverted in mounted position.

The flow guiding device can substantially be arranged around an end of the ignition assembly closest to the fire plate.

As mentioned before, this can mean that the blind surrounds an end of the ignition assembly closest to the fire plate at least partly, preferably completely.

It should be mentioned that the ignition assembly will protrude into the fire deck (also called fire plate) and can in some embodiments protrude into the main combustion chamber. The flow guiding device, according to certain embodiments of the invention, will in most cases not protrude into the main combustion chamber, but will be inside the cylinder head assembly.

The flow guiding device can partly extend into the fire deck. In preferred embodiments however, the flow guiding device can be arranged around the end of the ignition assembly closest to the fire deck, but not inside the fire deck.

The flow guiding device can be arranged between the ignition assembly and the cylinder head body. In particular, the flow guiding device can be disposed inside a cavity of the cylinder head body, which is part of the cooling cavity.

The plurality of orifices can comprise orifices of different sizes.

In a preferred embodiment of the invention, the ignition assembly can comprise at least one pre-chamber component part. Pre-chambers (short for pre-combustion-chamber) are smaller volumes, separate from the main combustion chamber, but in fluid communication therewith, which can be used for igniting a richer fuel air mixture than in the main combustion chamber creating flame jets projecting into the main combustion chamber.

As already mentioned, in particular for engines employing a lean burn concept, pre-chambers can therefore effectively be used to improve ignition performance.

Of course, the ignition assembly can also comprise a spark plug and optionally a spark plug sleeve.

The cylinder head body can comprise

- At least one intake opening for accommodating an intake valve, and
- at least one exhaust opening for accommodating an exhaust valve.

BRIEF DESCRIPTION OF THE DRAWINGS

Further details and advantages of certain embodiments of the invention are apparent from the figures and the accompanying description of the figures. The figures show.

DETAILED DESCRIPTION

Figure 1:
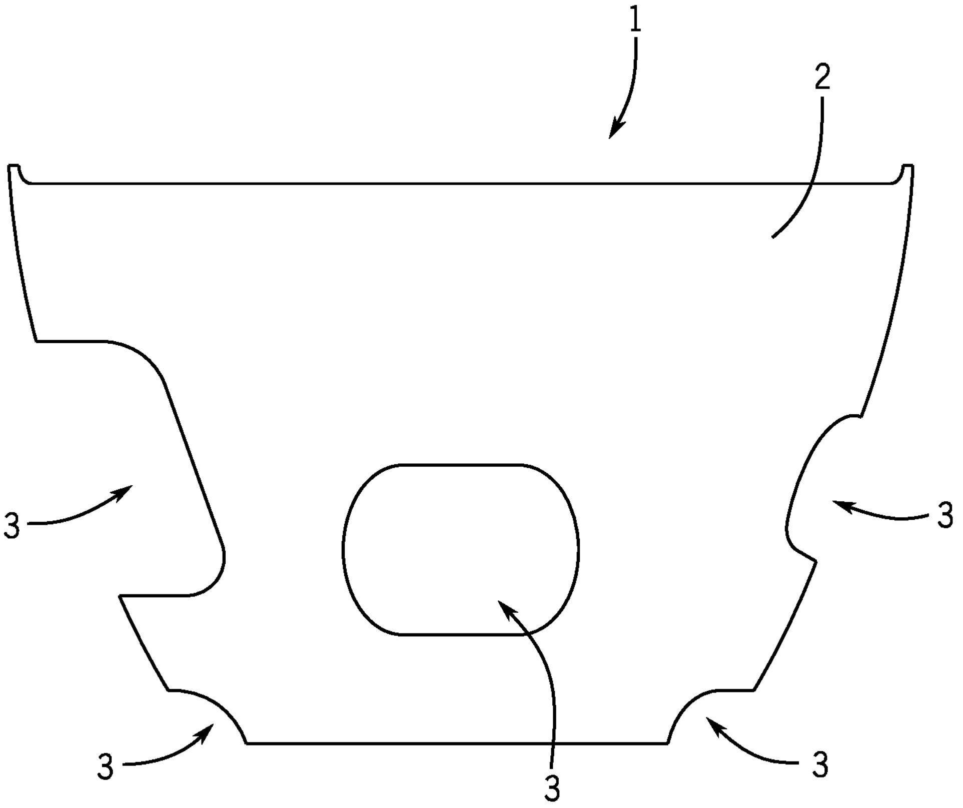
FIG. 1 is an embodiment of a flow guiding device according to the certain embodiments of invention.

FIG. 1 shows a flow guiding device 1 according to certain embodiments of the invention in a side view. As can be seen, the flow guiding device 1 is roughly of the shape of a truncated cone.

The flow guiding device 1 comprises a main body 2 and orifices 3 disposed on the truncated cone shape. The orifices 3 of the flow guiding device 1 depicted in FIG. 1 constitute different examples of how the orifices 3 can be embodied regarding size and shape (e.g. rounded oblong holes). Further examples and a visualisation of their effects can be found in FIGS. 4*a* to 4*c*.

Figure 2:
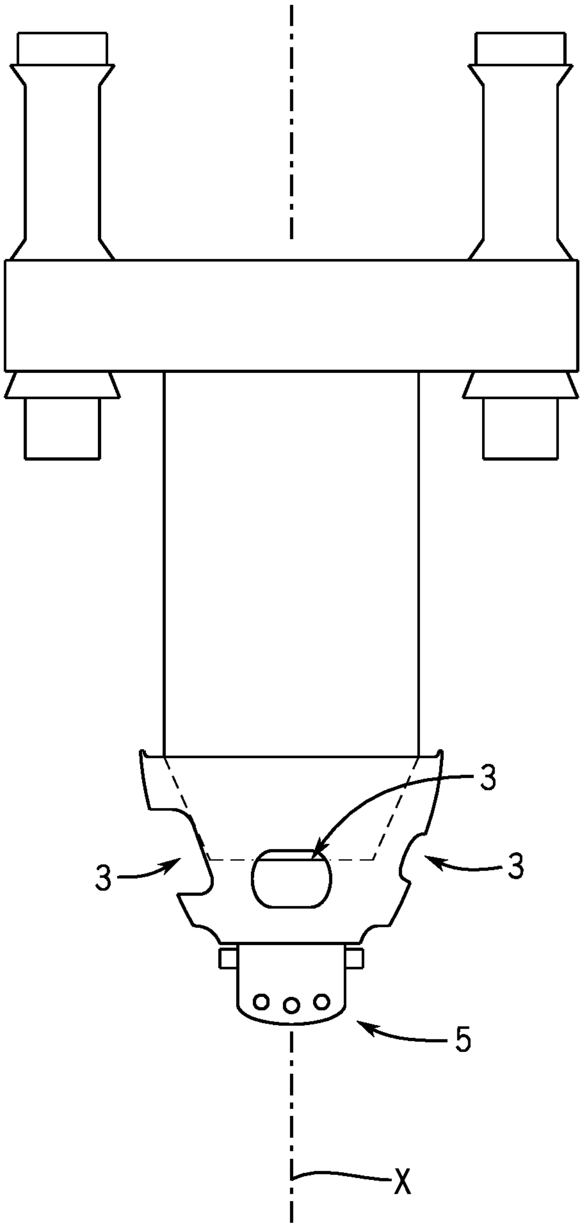
FIG. 2 is an embodiment of a flow guiding device according to certain embodiments of the invention fitted onto an ignition assembly.

The way an example of a flow guiding device 1 according to certain embodiments of the invention is arranged on the ignition assembly 5 is depicted in FIG. 2. The flow guiding device 1 is placed on the ignition assembly 5 roughly concentrically with a longitudinal axis X of the same.

Figure 3A:
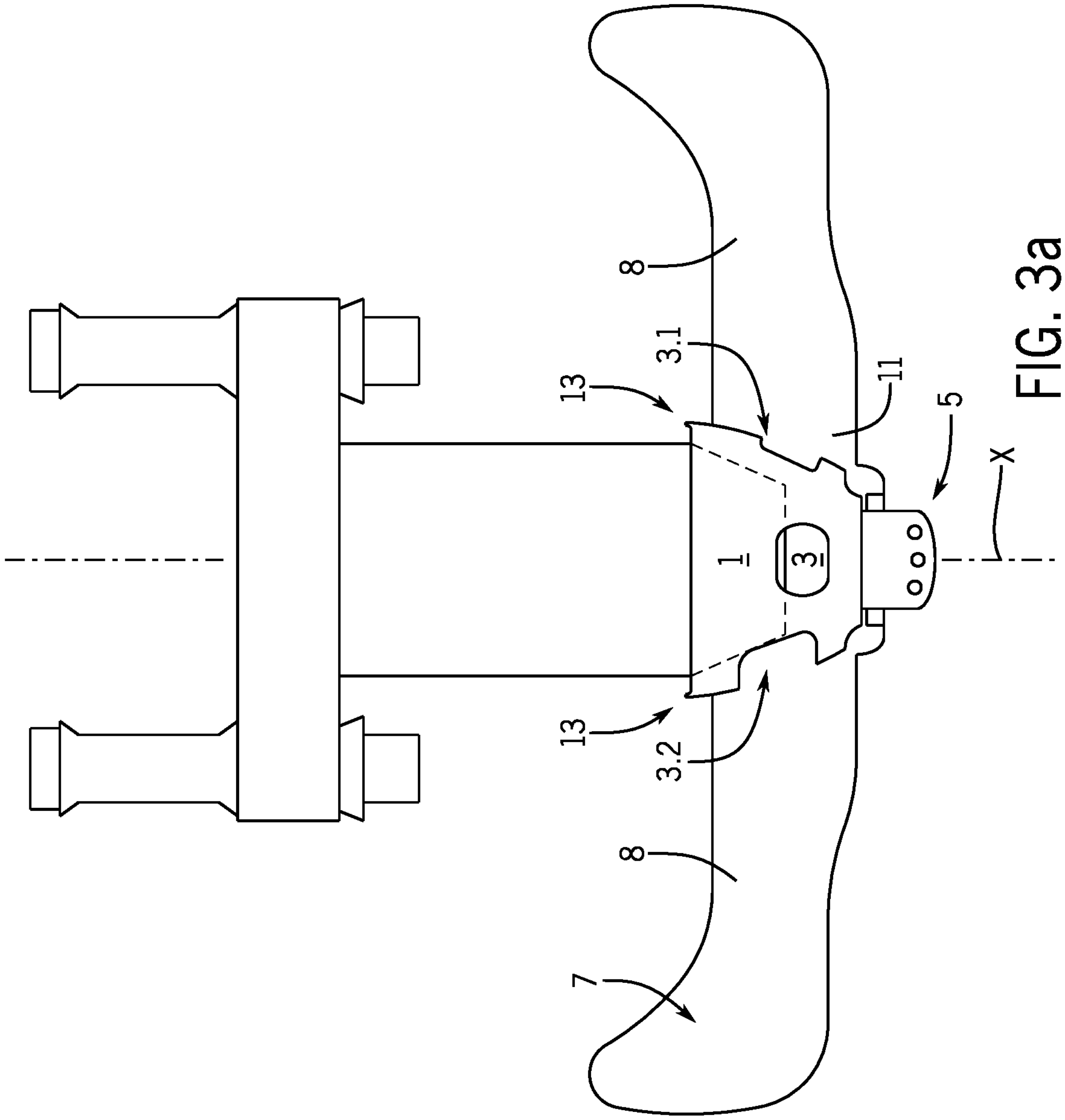
FIG. 3*a* is an embodiment of the internal combustion engine according to certain embodiments of the invention, in particular the flow guiding device fitted onto the ignition assembly together with a cooling cavity in a cylinder head.

FIG. 3*a* shows how the flow guiding device 1 fitted on the ignition assembly 5 is situated in relation to a cooling cavity 7 in a cylinder head body 4.

Figure 3B:
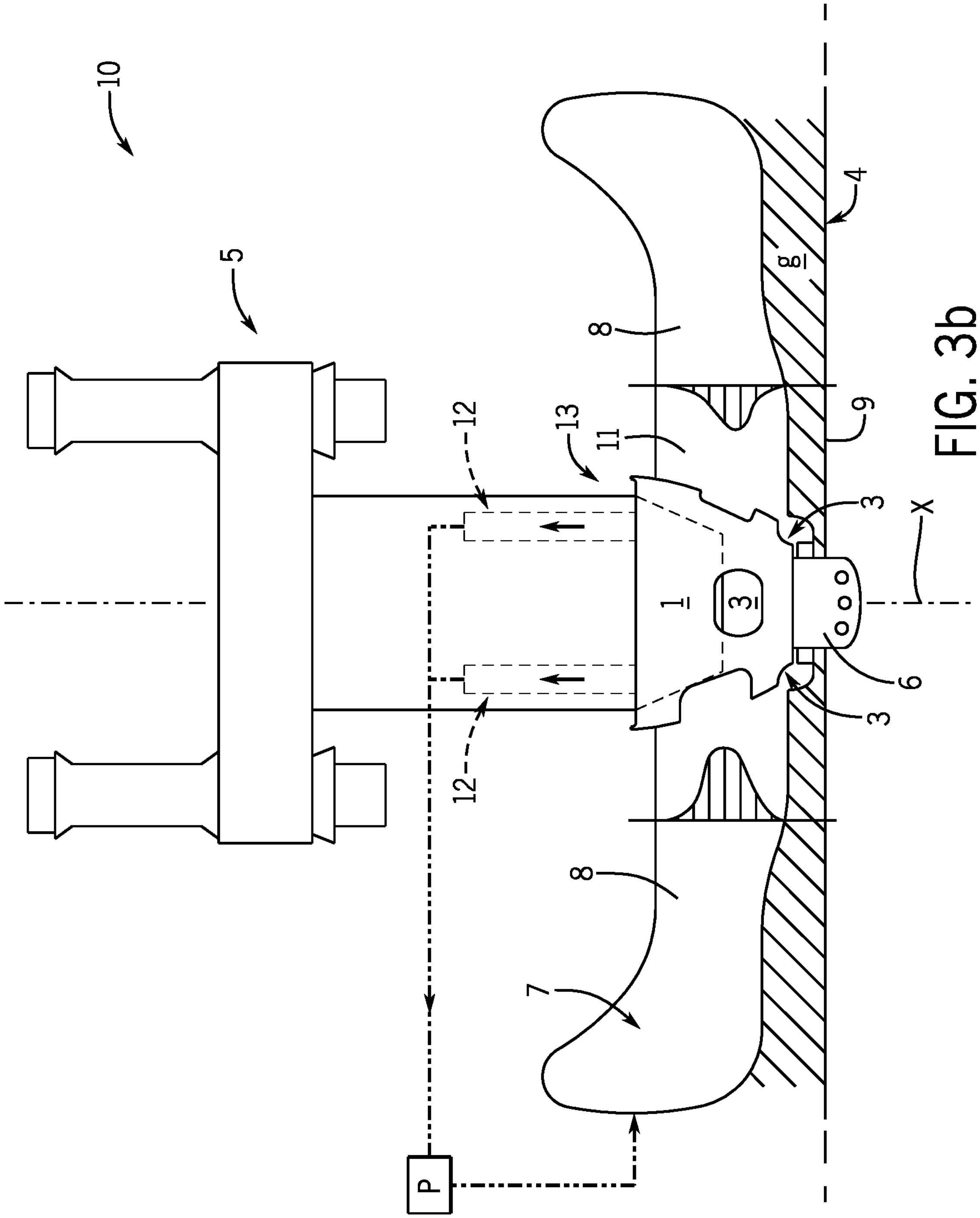
FIG. 3*b* is the depiction of FIG. 3*a* together with some further structure of the cylinder head assembly according to certain embodiments of the invention.

The cooling cavity 7 comprises a peripheral part, which transitions into the bridge cavities 8, which lead to the central cavity 11 and/or axial channels 12 (see FIG. 3*b*). The bridge cavities 8 are disposed between intake and exhaust openings (not depicted) in the cylinder head body 4.

In this particular example, there are orifices 3, 3.1 and 3.2 of various shapes and sizes on the flow guiding device 1. Additionally, visualisations of the flow profile created by the orifices 3 are drawn. As is for example apparent, a slightly offset orifice 3.1 pushes the flow profile closer to the lower part of the bridge cavity 8 (closer to the fire deck 9, see FIG. 3*b*) in comparison to the orifice 3.1.

Orifice 3.1 is also larger in cross-sectional area than orifice 3.1, which allows for a greater flow of cooling medium in this area. This can for example be beneficial if there are exhaust openings adjacent to the orifice 3.1, which are in need of greater cooling performance in the vicinity compared to the vicinity of intake openings (due to the combustion heat to which the exhaust openings are subjected).

Further cooling cavities 3 can be present, which are formed as cut-outs from the main body 2 of the flow guiding device 1, such that the orifices 3 are realised by the main body 2 together with a wall of the bridge cavities 8. Such orifices 3 can be used for bringing the flow of cooling medium even closer to the fire deck 9 (see also FIGS. 4*b* and 4*c*).

FIG. 3*b* shows the internal combustion engine in the area of the cylinder head assembly 10 according to certain embodiments of the invention. The ignition assembly 5 is arranged centrally inside an opening of the cylinder head body 4.

In this embodiment, the ignition assembly 5 abuts the fire deck 9 of the cylinder head body 4.

The axial channels 12 are parallel to the longitudinal axis X and are depicted symbolically.

A pump P is present which pumps cooling medium through the cooling cavities 7 and in particular the bridge cavities 8, to a central cavity 11 (not depicted as hidden behind the flow guiding device 1) and/or axial channels 12 and back to the pump P. Different other cooling cavities or the like can be disposed between the pump P and the mentioned objects. In particular, the cooling cavity 7 can be integrated into a water jacket of the cylinder head body 4.

Viewing FIG. 3*b* and FIG. 3*a* makes it clear that the flow guiding device 1 is arranged with its narrower end closer to the fire deck 9 and the main combustion chamber in the depiction below the fire deck 9.

The central axis of the main combustion chamber coincides with the longitudinal axis X of the ignition assembly 2 in this embodiment. In some other embodiments of the invention, however, the longitudinal axis X of the ignition assembly 5 can have a—in most cases relatively small—offset compared to the central axis of the main combustion chamber 9.

Figure 4A:
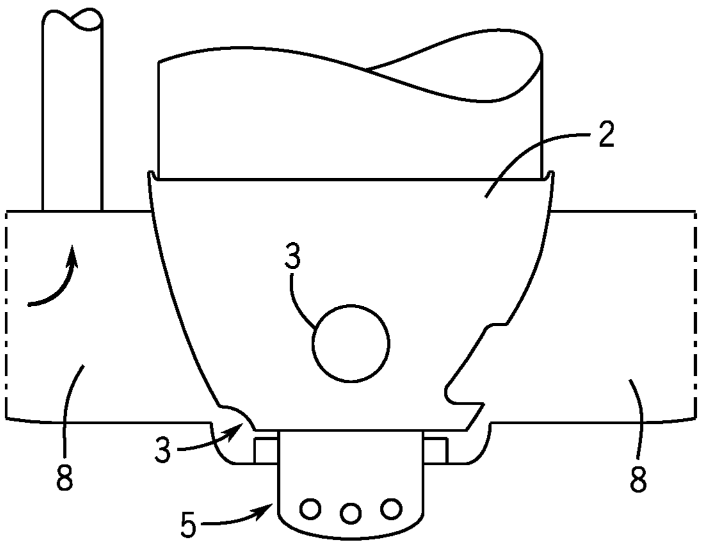
FIGS. 4*a* to 4*c* illustrate three examples of embodiments of flow guiding devices according to the certain embodiments of invention.
Figure 4B:
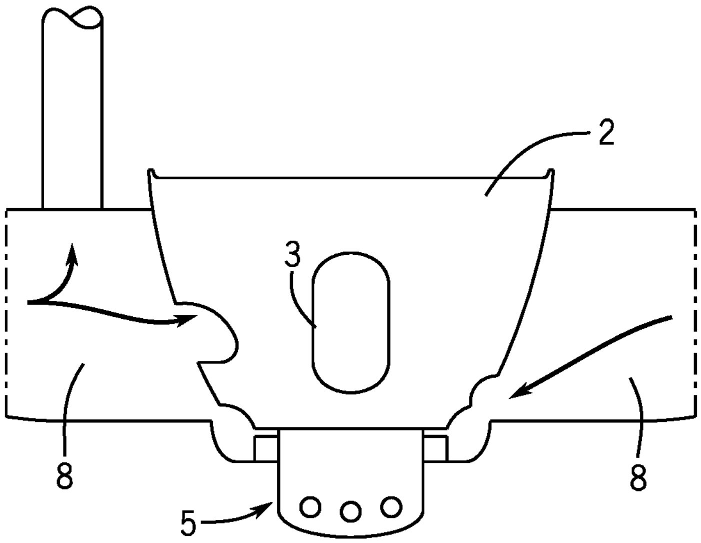
Figure 4C:
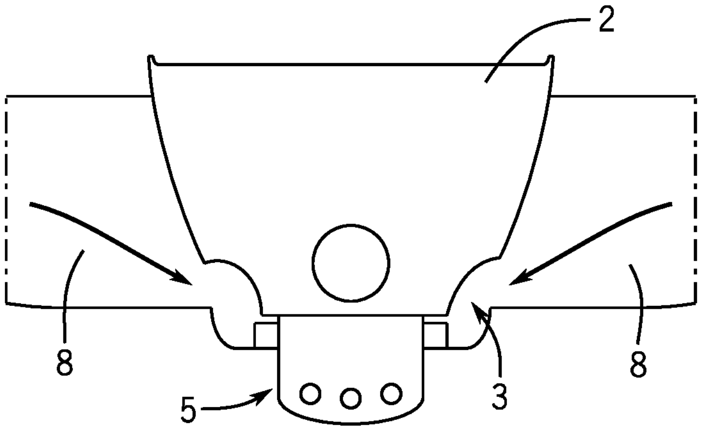

FIGS. 4*a* to 4*c* show different examples of flow guiding devices 1 with different shapes and embodiments of the orifices 3. The orifices 3 can be chosen such that the cooling medium flows through the bridge cavities 8 as desired (symbolised by arrows).

Several different shapes of the orifices 3 can be used as depicted in FIGS. 4*a* to 4*c*. The orifices 3 can be holes in the main body 2 of the flow guiding device 1. However, the orifices 3 can also be realised as cut-outs in the main body 2, while some side wall of the bridge cavity 8 serves as the rest of the boundary of the orifice 3.

Persons skilled in the art can choose the exact shape of the orifice 3 needed for the specific cooling needs at hand. As already noted, for example, bigger orifices 3 can be chosen for bridge cavities 3 adjacent to exhaust openings of the cylinder head body 4, and smaller orifices 3 can be used for bridge cavities 8 adjacent to intake openings in the cylinder head body 4.

Figure 5A:
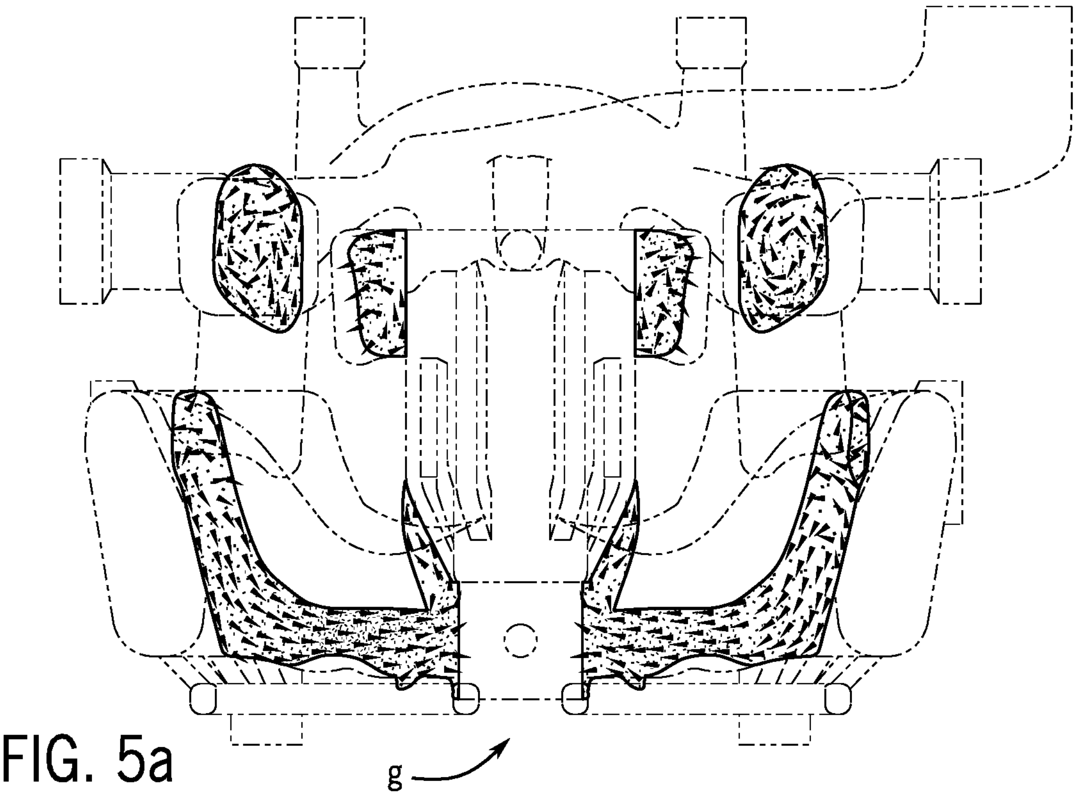
FIGS. 5*a*, 5*b* illustrate a cylinder head assembly according to the prior art and a cylinder head assembly according to certain embodiments of the invention.

FIG. 5*a* shows a cylinder head body according to the prior art without a flow guiding device 1 in the cooling cavity 7.

Figure 5B:
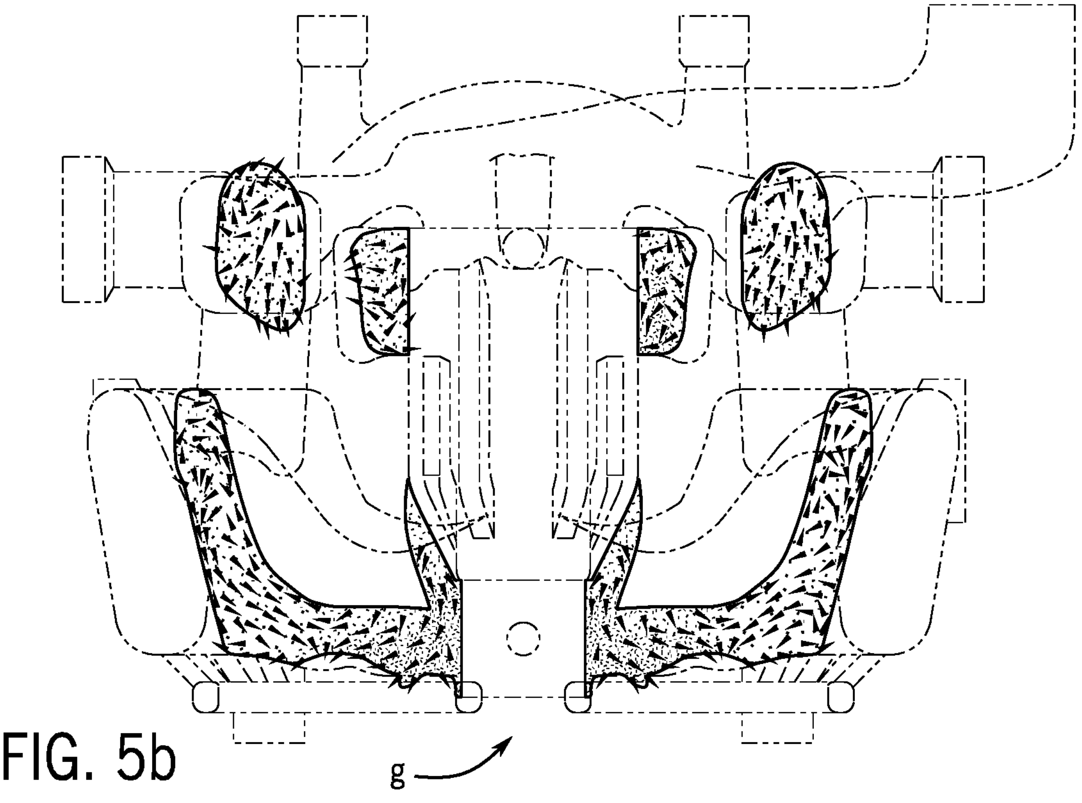

Comparing the flow visualisation of the cooling medium flow in FIGS. 5*a* and 5*b* shows the higher flow velocity of the cooling medium flow in the vicinity of the fire deck 9 close to the ignition assembly 5. This result is achieved with the flow guiding device 1 according to certain embodiments of the invention. The orifices 3 cause the higher flow velocity in the mentioned area.

Furthermore, the cooling medium flow in the embodiment according to the invention in FIG. 5*b* is directed from the distal end of the ignition assembly 5 towards the fire deck 9, i.e., inverted or "upside down" compared to the embodiment according to the prior art.

This helps to increase the effect of the flow guiding device 1 with its orifices 3 as the quicker flow is impinging directly on the backside (the upper side in FIG. 5*b*) of the fire deck 9.

However, the advantage of increased flow velocity can to a lesser extent than visible in FIG. 5*b* also be achieved when the direction of the cooling medium flow is from the fire deck 9 towards the distal end of the ignition assembly 2.

Figure 6:
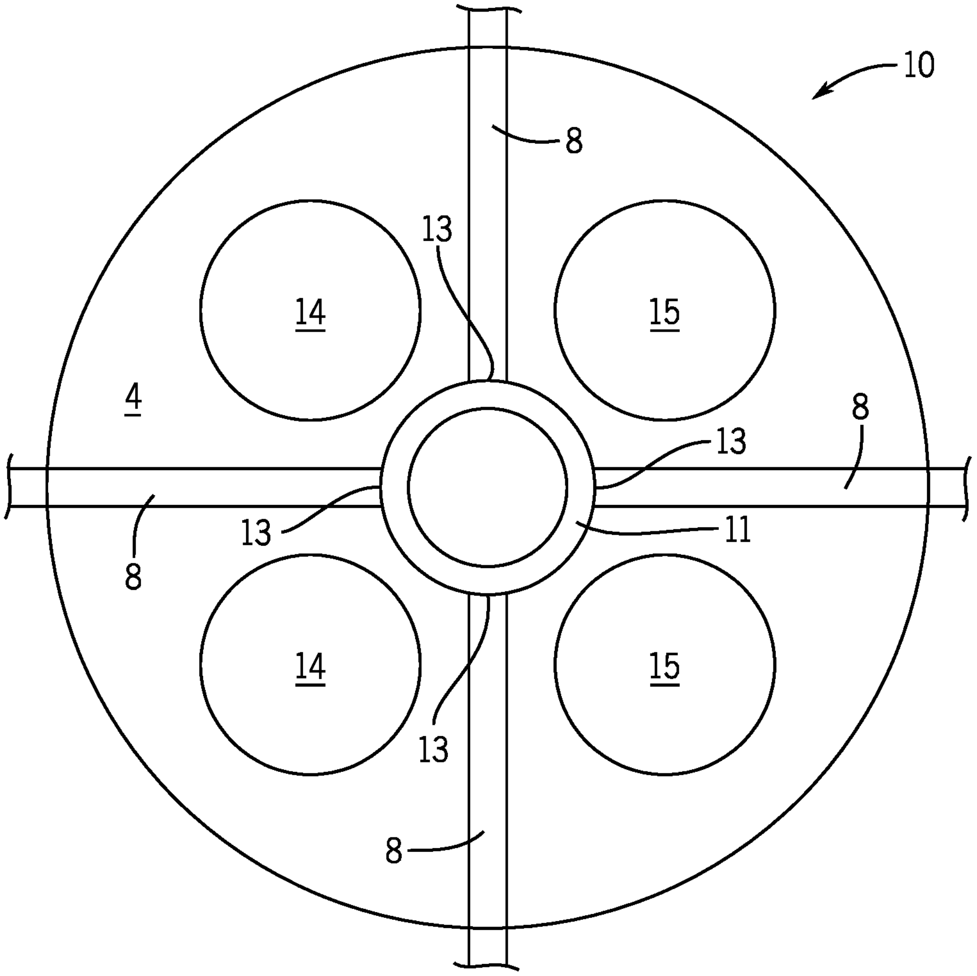
FIG. 6 is a schematic cross-sectional view of the cylinder head assembly according to the certain embodiments of invention.

FIG. 6 shows a purely schematic cross-sectional view of the cylinder head assembly 10. The bore of the cylinder which the cylinder head assembly 4 covers is indicated by the larger circle. The cylinder head body 4 in this embodiment comprises two intake openings 14 and two exhaust openings 15. Between the intake openings 14 and exhaust openings 15, the bridge cavities 8 lead to the central cavity 11, which is disposed around the ignition assembly 5 (not depicted in FIG. 6).

The flow guiding device 1 (also not depicted in FIG. 6) is arranged such that the orifices 3 are present at the interfaces 13 between the bridge cavities 8 and the central cavity 11. In other embodiments, the interfaces 13 could lead directly into the axial channels 12.

As mentioned in connection with FIGS. 3*a*, 3*b* as well as FIGS. 4*a* to 4*c*, the orifices 3 can be adapted, e.g., depending on the proximity of the specific orifice 3 to the exhaust openings 15, which receive some of the highest thermal loadings in the cylinder head.

The invention claimed is:

1. A system, comprising:

a flow guiding device for an internal combustion engine, comprising:

a main body substantially in the shape of a surface shell of a truncated cone and/or a cylinder; and a plurality of orifices in the main body, wherein the main body is adapted to be mounted between a cylinder head body and an ignition assembly of the internal combustion engine, and wherein the plurality of orifices are adapted to guide a cooling medium between an outside volume and an inside volume of the truncated cone and/or the cylinder; and a cylinder head assembly for the internal combustion engine including the cylinder head body, the ignition assembly, and a cooling cavity for cooling the cylinder head body and the ignition assembly, the cooling cavity including bridge cavities for cooling a fire deck of the cylinder head body, the bridge cavities leading from a peripheral part of the cylinder head body between inlet openings and exhaust openings in the cylinder head body to a central part of the cylinder head body, the cooling cavity furthermore comprising:

a central cavity in the central part of the cylinder head body, wherein the central cavity at least partly surrounds the ignition assembly and is in fluid communication with the bridge cavities, and axial channels disposed around the ignition assembly, wherein the axial channels are essentially parallel to a longitudinal axis of the ignition assembly, wherein the axial channels are in fluid communication with the bridge cavities and the central cavity.

2. The system of claim 1, wherein the cylinder head assembly further comprises a pump configured to convey the cooling medium from the central cavity and/or the axial channels to the bridge cavities, wherein the plurality of orifices are disposed at transitions between the bridge cavities and the central cavity and/or between the bridge cavities and the axial channels, and the plurality of orifices have a smaller cross-sectional area than the bridge cavities, such that a flow velocity of the cooling medium towards the peripheral part of the cylinder head body is increased at least in a region of the bridge cavities due to the passing of the cooling medium through the plurality of orifices and such that a direction of the cooling medium flow has a component towards the fire deck of the cylinder head body.

3. The system of claim 1, wherein the cylinder head assembly further comprises a pump configured to convey the cooling medium from the bridge cavities through the central cavity to the axial channels, wherein the plurality of orifices are disposed at transitions between the bridge cavities and the central cavity and/or between the bridge cavities and the axial channels, and the plurality of orifices have a smaller cross-sectional area than the bridge cavities, such that a flow velocity of the cooling medium towards the central part of the cylinder head is increased at least in a region of the bridge cavities due to the passing of the cooling medium through the plurality of orifices.

4. The system of claim 1, wherein the flow guiding device:

is embodied as at least one separate component part, and/or is mounted between the cylinder head body and the ignition assembly, and/or at least partially surrounds the ignition assembly, and/or is arranged on an end of the ignition assembly closest to the fire deck.

5. The system of claim 1, wherein the plurality of orifices comprise first orifices adjacent to intake openings in the cylinder head body and second orifices adjacent to exhaust openings in the cylinder head body, wherein the first orifices have a smaller cross-sectional area than the second orifices.

6. The system of claim 1, wherein the central cavity and/or the axial channels are delimited in part by the ignition assembly and in part by the cylinder head body.

7. The system of claim 1, wherein:

the plurality of orifices comprise four orifices, and/or the plurality of orifices are in the shape of rounded oblong holes, and/or circular holes, and/or cut-outs at an end of the main body closest to the fire deck, and/or the plurality of orifices are evenly distributed circumferentially around the truncated cone and/or the cylinder head and/or the ignition assembly.

8. The system of claim 1, comprising the internal combustion engine having at least one of the cylinder head assembly with the flow guiding device.

9. A system, comprising:

a cooling guide portion of a cylinder head assembly of an internal combustion engine, wherein the cooling guide portion comprises a plurality of orifices disposed in a central part of a cylinder head body having a cooling cavity, wherein the cooling cavity includes bridge cavities for cooling a fire deck of the cylinder head body, wherein the bridge cavities extend from a peripheral part of the cylinder head body between inlet openings and exhaust openings in the cylinder head body to the central part of the cylinder head body, wherein the plurality of orifices are configured to increase a flow velocity of a cooling medium at least in a region of the bridge cavities along a fire deck of the cylinder head body, wherein at least one orifice of the plurality of orifices is directed toward the fire deck to direct at least a portion of the cooling medium in a flow direction against the fire deck.

10. The system of claim 9, wherein the plurality of orifices comprise a first orifice adjacent to an intake opening in the cylinder head body and a second orifice adjacent to an exhaust opening in the cylinder head body, wherein the first orifice has a smaller cross-sectional area than the second orifice.

11. The system of claim 9, wherein the at least one orifice of the plurality of orifices directs the portion of the cooling medium in the flow direction to impinge against the fire deck.

12. The system of claim 9, wherein the cooling guide portion is configured to mount removably in the cylinder head body, the cooling guide portion is configured to mount removably about an outer wall of an ignition assembly comprising an ignition plug, a pre-chamber component, or a combination thereof, and the cooling guide portion is a separate component part from the ignition plug and the pre-chamber component.

13. The system of claim 9, wherein each of the plurality of orifices has a smaller cross-sectional area than the bridge cavities.

14. The system of claim 9, wherein the cooling cavity comprises:

a central cavity in the central part of the cylinder head body, wherein the central cavity at least partly surrounds an ignition assembly and is in fluid communication with the bridge cavities; and/or axial channels disposed around the ignition assembly, wherein the axial channels are parallel to a longitudinal axis of the ignition assembly, and the axial channels are in fluid communication with the bridge cavities.

15. The system of claim 9, comprising the cylinder head assembly, the internal combustion engine, or a combination thereof.

16. The system of claim 9, comprising a flow guiding device having the cooling guide portion, wherein the flow guiding device comprises:

a main body;

the plurality of orifices in the main body, wherein the main body is adapted to be mounted between the cylinder head body and an ignition assembly of the internal combustion engine, and wherein the plurality of orifices are adapted to guide the cooling medium in a radial direction between an outside volume and an inside volume of the main body relative to a central axis of the main body.

17. A method, comprising:

guiding a cooling medium via a cooling guide portion of a cylinder head assembly of an internal combustion engine, wherein the cooling guide portion comprises a plurality of orifices disposed in a central part of a cylinder head body having a cooling cavity, wherein the cooling cavity includes bridge cavities for cooling a fire deck of the cylinder head body, wherein the bridge cavities extend from a peripheral part of the cylinder head body between inlet openings and exhaust openings in the cylinder head body to the central part of the cylinder head body; and increasing a flow velocity of the cooling medium at least in a region of the bridge cavities via the plurality of orifices, wherein at least one orifice of the plurality of orifices is directed toward the fire deck to direct at least a portion of the cooling medium in a flow direction against the fire deck.

18. The method of claim 17, comprising directing at least the portion of the cooling medium in the flow direction to impinge against the fire deck.

19. The method of claim 17, comprising:

directing a first portion of the cooling medium from one or more first orifices of the plurality of orifices to cool an intake opening in the cylinder head body; and directing a second portion of the cooling medium from one or more second orifices of the plurality of orifices to cool an exhaust opening in the cylinder head body, wherein the one or more second orifices provide a greater flow of the cooling medium than the one or more first orifices.

20. The method of claim 19, wherein the one or more first orifices have a smaller cross-sectional area than the one or more second orifices.

21. A system, comprising:

a flow guide for an internal combustion engine, comprising:

a main body; and a plurality of orifices in the main body, wherein the main body is adapted to be mounted between a cylinder head body and an ignition assembly of the internal combustion engine, the plurality of orifices are adapted to guide a cooling medium between an outside volume and an inside volume of the main body, the plurality of orifices comprise one or more first orifices adjacent to an intake opening in the cylinder head body and one or more second orifices adjacent to an exhaust opening in the cylinder head body, and the one or more first orifices have a smaller cross-sectional area than the one or more second orifices.

22. The system of claim 21, wherein at least one orifice of the plurality of orifices is directed toward a fire deck of the cylinder head body to direct at least a portion of the cooling medium in a flow direction against the fire deck.

23. The system of claim 21, comprising the cylinder head body, the ignition assembly, the internal combustion engine, or a combination thereof, wherein the ignition assembly comprises an ignition plug, a pre-chamber component, or a combination thereof.

24. A system, comprising:

a flow guide for an internal combustion engine, comprising:

a main body; and a plurality of orifices in the main body, wherein the main body is configured to mount removably in a cylinder head body, wherein the main body is configured to mount removably about an outer wall of an ignition assembly comprising an ignition plug, a pre-chamber component, or a combination thereof, wherein the main body is a separate component part from the ignition plug and the pre-chamber component, wherein the plurality of orifices are configured to direct a cooling medium to cool a fire deck of the cylinder head body.

25. The system of claim 24, wherein the plurality of orifices comprise one or more first orifices having a smaller cross-sectional area than one or more second orifices, and the one or more second orifices are directed toward one or more areas in need of greater cooling performance as compared with the one or more first orifices.

26. The system of claim 25, wherein the one or more first openings are directed toward an intake opening, and the one or more second orifices are directed toward an exhaust opening.

* * * * *